United States Patent

Richard et al.

[11] Patent Number: 5,855,450
[45] Date of Patent: Jan. 5, 1999

[54] HYDROSTATIC RELEASE DEVICE FOR SAFETY EQUIPMENT

[76] Inventors: Jean-Christophe Richard, 1, rue du Midi, Neuilly-sur-Seine F-92200, France; Kenny Cadoux, 58, boulevard Michelet, Nantes F44300, France

[21] Appl. No.: 640,880
[22] PCT Filed: Nov. 16, 1994
[86] PCT No.: PCT/FR94/01337
§ 371 Date: Jun. 24, 1996
§ 102(e) Date: Jun. 24, 1996
[87] PCT Pub. No.: WO95/13957
PCT Pub. Date: May 26, 1995

[30] Foreign Application Priority Data

Nov. 16, 1993 [FR] France .................................. 93 13619

[51] Int. Cl.⁶ .................................................. B25G 3/18
[52] U.S. Cl. ........................... 403/321; 403/316; 403/322; 285/316; 114/378
[58] Field of Search .................................. 403/315, 316, 403/321, 322; 114/367, 378, 379; 285/316, 317, 921

[56] References Cited

U.S. PATENT DOCUMENTS

| | | | |
|---|---|---|---|
| 2,360,848 | 10/1944 | Bryant | 114/367 |
| 2,824,315 | 2/1958 | McKenny | 114/367 |
| 2,839,767 | 6/1958 | Sieverts | 114/367 |
| 2,942,903 | 6/1960 | Giladett | 403/321 X |
| 3,075,208 | 1/1963 | Mercer et al. | 114/367 |
| 4,828,035 | 5/1989 | McInturff | 403/322 X |
| 5,365,873 | 11/1994 | Wigram | 114/367 |
| 5,438,949 | 8/1995 | Day | 114/367 |
| 5,573,343 | 11/1996 | Davis et al. | 403/31 |

FOREIGN PATENT DOCUMENTS

| | | | |
|---|---|---|---|
| 545337 | 6/1993 | European Pat. Off. | 285/921 |
| 598601 | 5/1994 | European Pat. Off. | 114/367 |
| 883044 | 11/1961 | United Kingdom | 114/367 |

*Primary Examiner*—Kenneth J. Dorner
*Assistant Examiner*—Bruce A. Lev
*Attorney, Agent, or Firm*—Zarley, McKee, Thomte, Voorhees, & Sease

[57] ABSTRACT

An improved release device for safety equipment has a housing including a body, a cover attached thereto with a resilient flexible membrane inserted therebetween, and an attachment portion releasably secured to the cover. The cover has shoulders protruding radial inward within the bore. The release device has a cap rigidly mounted to the membrane and an annular gap exits between the shoulders and the cap. The attachment portion has elastically flexible legs with enlarged ends that extend into the bore. The ends deflect inwardly when engaged by the shoulders and then spring outwardly and are retained in a recess below the gap because the enlarged ends are wider than the gap. When the pressure forces the membrane to move away from the bore, the cap moves with it to enlarge the gap and allow the legs of the attachment portion to escape from the cover, whereby the safety equipment is released when the water pressure is sufficiently high. The device is testable and may be reset and reused at will. Such a release device is particularly useful in emergency locator beacons, life rafts, etc., and more generally in any device designed for use under conditions involving pressure changes.

6 Claims, 2 Drawing Sheets

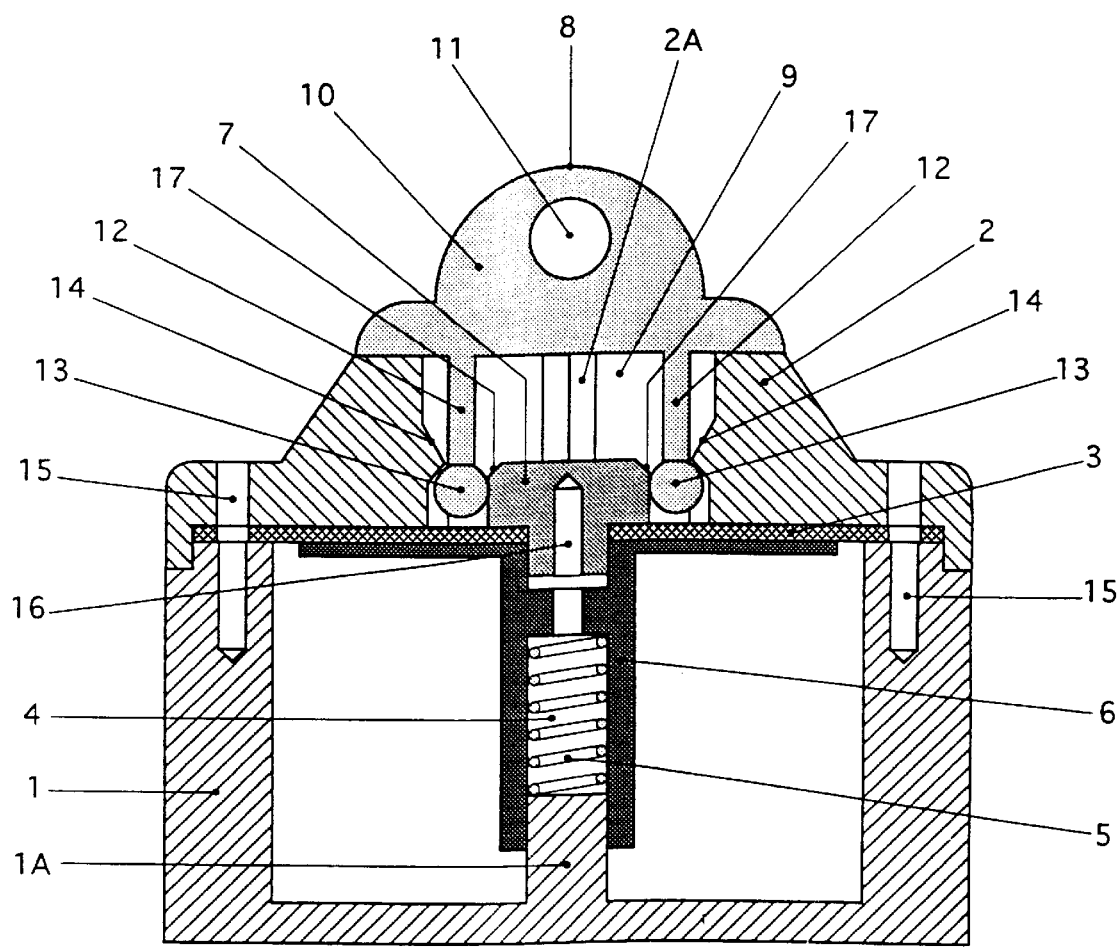
FIG : 1

FIG : 2
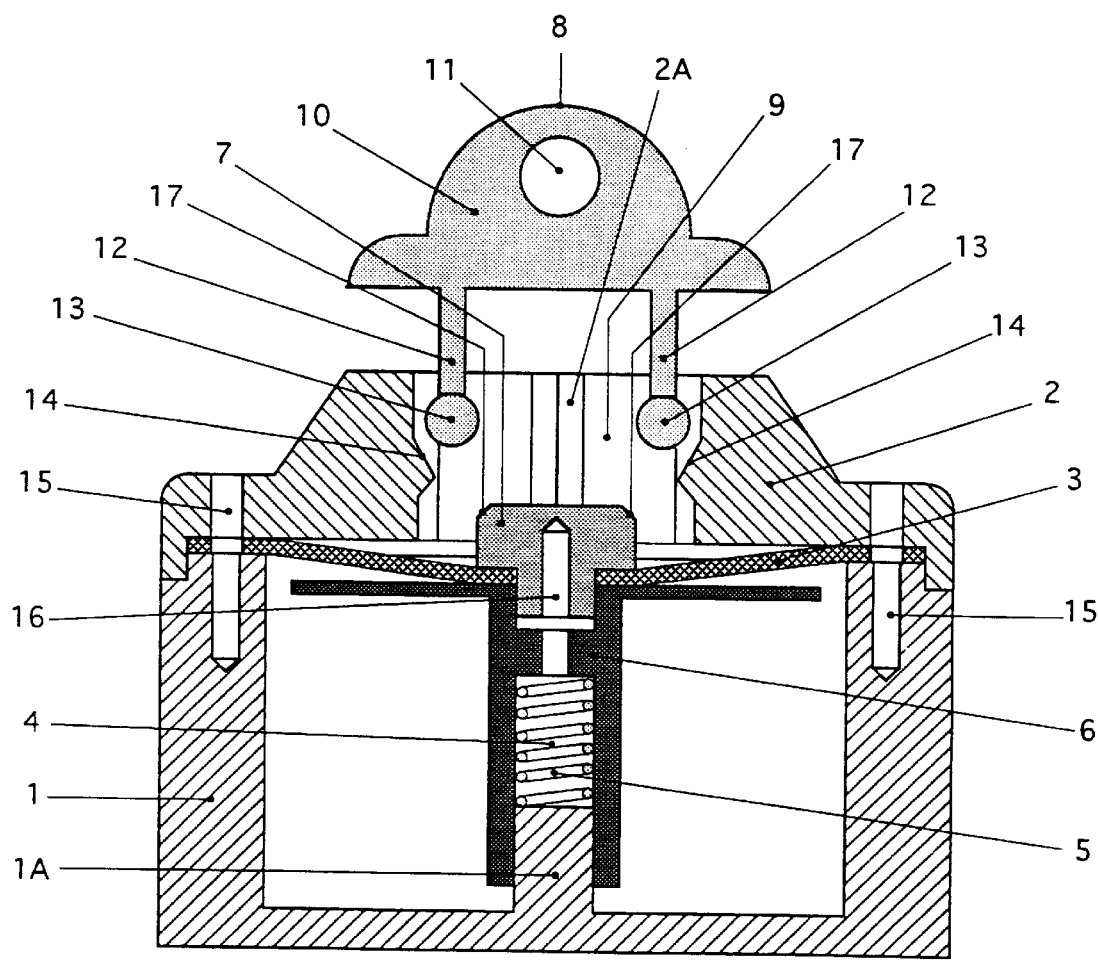

HYDROSTATIC RELEASE DEVICE FOR SAFETY EQUIPMENT

This invention concerns safety equipment installed on ships, aircraft and similar equipment designed to come into action when they enter water. It is particularly concerned with the design and manufacture of a hydrostatic release device for any safety equipment that may be used when accidents occur during the type of crash mentioned above.

It is known that regulations require that ships and other vessels above a certain size and which could be completely and accidentally immersed in water must be equipped with safety devices, including particularly emergency locator beacons, rafts, etc.

Release devices with manual or automatic operation have been proposed and/or marketed for a long time, and generally consist of a rigid hollow box fitted with a flexible or membrane device sensitive to hydrostatic pressure, connected to the safety equipment support bolt and associated with a spring with a known force. When the device is immersed in water, hydrostatic pressure is exerted on the membrane thus triggering the release system (see very old invention patents GB-907.001/GB-A-883.044/GB-A-2.005.336/DE 1.245.787).

Several improvements have been suggested recently for these release devices. For example, it is recommended to use a flexible air chamber type of pocket as a deformable device instead of a membrane, which avoids some disadvantages of the membrane and eliminates use of a spring (European patent No. 0296219). However, there are a number of problems with this type of release device and it is also quite difficult and expensive to make. In particular, for a given immersion level, forces due to the pressure exerted on the air pocket or chamber are distributed over its entire surface, and not only along the line along which the device is released. Therefore the resulting force exerted to activate the safety equipment release system does not correspond to the maximum (in other words optimum) required force, although this is the case when a single flexible membrane is used.

The system of the box with a membrane together with a spring is reused in another product marketed under the name of HAMAR, the means of releasing the safety equipment consisting of a blade activated by a spring and designed to separate the support device (European patent application No. 0198805).

This type of system has a number of disadvantages, including:
- severe oxidation of the various metal devices,
- a blade which does not cut cleanly if it is made of stainless steel, and which rusts so that it is no longer capable of performing its function if it is not made of stainless steel,
- a brittle beacon attachment system, satisfying a number of cutting problems encountered.

but the major disadvantage is the fact that it will only operate once, and it is impossible to reset the cutting system. Therefore this is equivalent to using a throwaway and non-testable device which does not fully satisfy required safety standards.

The invention overcomes the various disadvantages of known devices, including those mentioned above. Its purpose is to suggest a safety equipment release device based on the known principle of a box with a lower sealed body and cover with flexible membrane associated with a spring and a means of attachment of the safety equipment, but with the major advantage that it can be reset and reused as many times as required. Furthermore, this device has a simple structure, has all required guarantees and may be tested, unlike most systems marketed at the present time.

According to its essential characteristics, the new release device according to the invention is equipped with an attachment portion for safety equipment and includes a lower sealed body onto which a cover crossed by a recess is fixed, together with a flexible membrane placed between said body and said cover and capable of being bent towards the inside of the body under the effect of pressure exerted from the outside, and a cap rigidly attached to said membrane, wherein the recess is equipped with shoulders facing the inside of the recess and located in a position with respect to the upper part of the cap such that installation of the attachment portion requires that the lower ends of said attachment portion pass through the recess, and beyond the recess shoulders and the thrust of the cap towards the inside of the body, in order to fit between the side walls of the cap and the sides of the recess and are then fixed in place when the cap returns to the normal position, an external pressure causing inwards bending of said membrane, this deflection being accompanied by displacement of the cap towards the inside of the body and separation of the top part of the cap from the recess shoulders, a separation which releases blockage of the lower ends of the attachment portion, their passage through the recess beyond the shoulders and release of said attachment portion.

Other characteristics and details will become clear in reading the following description of a non-limitative embodiment, illustrated by drawings in the Appendix which represent:

FIG. 1, a sectional view of a safety equipment release device according to the invention, in the closed position (attachment portion for safety equipment engaged), FIG. 2, a sectional view of the same width in the open position (attachment portion for safety equipment released).

As shown in the figures, the release device comprises essentially a lower body 1 onto which a cover 2 is fitted by bolts or screws 15, with insertion of a flexible membrane 3, and a attachment portion 8 for safety equipment. Body 1 is associated with a shaped part 6 to form a central housing 4 in which a spring 5 is positioned. Element 6 is firmly fixed by a screw or bolt 16 to a cap 7 projecting in cover 2, elements 6 and 7 trapping membrane 3 at its center. The shaped part 6 supports membrane 3, and acts as a slide. As will be described later, elements 6 and 7 move inside the lower body 1, with element 6 sliding around the central stand 1A of the lower body 1, and element 7 sliding in grooves 2A in cover 2, when the release device is immersed in water (FIG. 2).

As can be seen on the figures, in this case the attachment portion 8 is a single piece comprising a head 10 with passage 11 for the link between the safety equipment support device (not shown) and its support, and legs 12 which have a cylindrically shaped lower end 13. The attachment portion 8 is engaged in the closed position (FIG. 1), in other words ends 13 of legs 12 are blocked between the side walls of cap 7 and shoulders 14, as follows: the cylindrical ends 13 pass through recess 9, they are forced closer to each other by the pressure on the upper faces of shoulders 14 and the thrust exerted by them on cap 7 towards the inside of the body 1, which compresses spring 5 through shaped part 6, their passage beyond shoulders 14 and then the return to the normal blocking position of the cap 7 between lower ends 13 of legs 12. Release of the attachment portion 8 thus releasing the safety equipment takes place when the device is immersed in water. The additional water pressure added in recess 9 causes deflection of the flexible membrane 3 which moves cap 7 towards the inside of body 1, therefore separates the upper part of cap 7 from shoulders 14, allowing ends 13 to pass through the recess beyond shoulders 14.

The legs 12 of the attachment portion 8 are elastic for this purpose, in order to enable their cylindrical ends 13 to approach each other and thus enable passage of said ends beyond shoulders 14 of recess 9 in cap 2. A chamfer 17 is useful on the upper edges of the cap 7, in order to facilitate engagement and disengagement of cylindrical ends 13.

This release device with a simple design may be made economically from a variety of appropriate materials, for example most parts can be made of plastic.

In practice, the various studies and experiments carried out have shown that the combination of criteria associated with support spring 5, flexible membrane 3 (materials, diameter, elasticity, density, etc.), and the return stroke of cap 7, can give the required release depth very precisely. Furthermore, the extreme simplicity of the safety equipment release system means that the release system is extremely reliable, regardless of the chosen depth and surrounding climatic conditions.

We claim:

1. A hydrostatic release device for safety equipment, comprising:

a body having a hollow cavity therein;

a cover having a bore therethrough and generally opposing shoulders protruding radially inward within the bore, the cover being mounted to the body in covering relation to the hollow cavity such that a portion of the bore registers with the hollow cavity;

a resilient flexible membrane mounted between the body and the cover so as to cover the bore, the membrane being yieldably deflectable with respect to the shoulders in response to a pressure in the bore which is indicative of an ambient pressure outside the device;

a cap rigidly mounted on the membrane and thereby movable therewith with respect to the shoulders to a retention position wherein the cap is proximate to and generally registered with the shoulders such that a first annular gap having a given width between the cap and the shoulder is defined; and an attachment portion releasably secured to the cover, the attachment portion having a plurality of elastically flexible legs rigidly fixed thereto which are adapted to extend into the bore when the attachment portion is secured to the cover, the legs having free enlarged ends which are deflectable inwardly toward each other when the legs contact the shoulders, the enlarged ends have a cross-sectional width that is larger than the width of the first annular gap;

the legs extending into the bore and past the shoulders such that the enlarged ends are disposed between the shoulders, the membrane, and the cap which extends between the legs into the retention position so that the enlarged ends of the legs are retained between the shoulders and the cap and cannot escape past the shoulders through the first annular gap, thus the attachment member is secured to the cover; and whereby the attachment portion is released from the cover when the pressure in the bore is sufficient to deflect the membrane such that the cap mounted thereto moves away from the shoulder to a releasing position so as to define a second annular gap having a width between the shoulders and the cap which is large enough to permit the enlarged ends of the legs to escape therethrough.

2. Release device according to claim 1 wherein the attachment portion comprises a head and the legs are integrally formed therewith as a single piece.

3. Release device according to claim 1, characterized in that the enlarged ends (13) of legs (12) of the attachment portion (8) are cylindrically shaped and have a diameter greater than the diameter of said legs (12).

4. Release device according to claim 1, characterized in that chamfers (17) are formed on said cap (7) to facilitate engagement and disengagement of the enlarged ends (13) of the attachment portion (8) legs (12).

5. Release device according to claim 1 wherein the bore has a side wall with a groove extending longitudinally therein and the cap has a corresponding projection thereon which is adapted to slide longitudinally in the groove.

6. Release device according to claim 1, characterized in that the enlarged ends (13) of legs (12) of the attachment portion (8) are cylindrically shaped and have a diameter greater than the diameter of said legs (12).

* * * * *